(12) United States Patent
Silver et al.

(10) Patent No.: US 7,260,189 B2
(45) Date of Patent: Aug. 21, 2007

(54) SYSTEMS AND METHODS FOR INFORMATION PROVISION

(75) Inventors: Edward Michael Silver, Atlanta, GA (US); Anita Hogans Simpson, Decatur, GA (US); Stephanie Smith Plunkett, Covington, LA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 362 days.

(21) Appl. No.: 10/336,642

(22) Filed: Jan. 3, 2003

(65) Prior Publication Data

US 2004/0131162 A1 Jul. 8, 2004

(51) Int. Cl.
*H04M 1/64* (2006.01)
(52) U.S. Cl. .............. 379/88.23; 379/88.12; 704/260
(58) Field of Classification Search ............ 379/88.12, 379/88.22, 88.23, 88.25, 88.26, 67.1, 88.13; 704/260
See application file for complete search history.

(56) References Cited

U.S. PATENT DOCUMENTS 4,602,129 A * 7/1986 Matthews et al. ....... 379/88.26
6,182,041 B1 * 1/2001 Li et al. .................. 704/260
6,442,243 B1 * 8/2002 Valco et al. .............. 379/67.1
6,731,725 B1 * 5/2004 Merwin et al. ......... 379/88.23
6,760,412 B1 * 7/2004 Loucks ................... 379/88.13

OTHER PUBLICATIONS

Message Delivery Service Instructions, BellSouth Integrated Product Catalog, pp. 1-4, Dec. 5, 2002.
Pager Notification Service, BellSouth Integrated Product Catalog, pp. 1-2, Dec. 5, 2002.
BellSouth Voice Mail Service Instructions, BellSouth Integrated Product Catalog, pp. 1-20, Dec. 5, 2002.

* cited by examiner

*Primary Examiner*—Gerald Gauthier
(74) *Attorney, Agent, or Firm*—Thomas, Kayden, Horstemeyer & Risley, LLP (57) ABSTRACT

One or more voice mail messages, respectively, may be provided as one or more reminder messages. After the playing of a voice mail message, an option may be provided to use the message as a reminder message. Delivery information for the reminder message is obtained. The delivery information may include the user's telephone number, another telephone number, multiple telephone numbers, or identifiers for other devices. The delivery information also may include a designated time for delivery or different times for each of the destinations. The delivery of the reminder message may be password protected. The reminder message is delivered based on the delivery information. If the reminder message is password protected, the reminder message is delivered in response to receipt of the password.

21 Claims, 6 Drawing Sheets

SYSTEMS AND METHODS FOR INFORMATION PROVISION

FIELD OF THE INVENTIONS

The inventions generally relate to the field of telecommunications, and more particularly, relate to the field of information delivery through messaging.

BACKGROUND OF THE INVENTIONS

When an alarm clock goes off, it reminds us to wake up and get going. Many of us hit the "snooze" option (repeatedly!) to gain a few more minutes of sleep until another reminder goes off in another attempt to get us to wake up and get going.

In addition to the alarm clock, we may receive reminders in other ways. For example, we may receive messages reminding us of doctor's and dentist's appointments, school meetings, work deadlines, sports schedules, family gatherings, outings with friends, or other events. Often, these messages are delivered via voice mail messages to voice mail systems. When I listen to my voice mail messages, I may receive one or more messages that serve as reminders. Sometimes these messages relate only to me. At other times, the messages may be pertinent to other people.

When I receive a voice mail message that is pertinent to other people, I have few options for providing the other people with the information. For example, if I receive a voice mail message on our voice mail system about a change in the scheduling of my husband's weekend soccer game, I may desire to share that information with my husband. (At least, he would desire I share this information with him!) If my husband is not at home, I could call him with the information. But that would entail me leaving the voice mail system and placing a separate call to my husband. Knowing that my husband is busy in meetings all day, I may decide to make the call, even though I know that I will reach my husband's voice mail system and I will have to record a summary of the change in the soccer schedule.

In other words, conveying the information on the change in soccer schedule is complicated by the fact that I have to exit my voice mail system, make a call to my husband's telephone number, reach his voice mail system, and record my own message summarizing the details of the schedule change that were provided in the original message. Leaving my voice mail system is inconvenient because I may have to interrupt my review of our other voice mail messages. I could avoid the interruption and finish reviewing our other voice mail messages, but the information may be urgent and important to my husband. In addition, I may forget the details of the changes in the soccer schedule if I do not make an immediate call to my husband. Making a call to my husband's telephone number consumes my time and may be inconvenient—especially if he or I are busy with other matters. The inconvenience is exacerbated by reaching my husband's voice mail system instead of reaching him directly. Typically, a call to my husband's office requires several unanswered ring cycles to result in diversion of the call to the voice mail system. Thus, my time is wasted and I am inconvenienced while I interrupt my review of our voice mail messages, while I make the call to my husband's number, and while I wait for my call to rollover to his voice mail system.

When I finally reach my husband's voice mail system, I have to listen to his greeting, and then record a voice mail message including the details of the change in the soccer schedule. Waiting for the greeting to finish wastes my time. The waste of time is an inconvenience, but it also may operate to create problems with message delivery. After having to interrupt my review of voice mail messages or after completion of my review of voice mail messages, after making the call to my husband's telephone number, and after waiting through several ring cycles to be routed to my husband's voice mail system, I may have forgotten or otherwise confused the details of the change in the soccer schedule. The message I record may not accurately reflect the change in the soccer schedule. The result is that I may have wasted my time and also my husband's time through the inefficient and incorrect relay of information regarding the change in the soccer schedule.

To solve the problems, I may suggest that my husband give up soccer. Knowing that is an impossible request, there is a need for a way to be able to relay the information about the change in the soccer schedule without having to interrupt my review of voice mail messages, without having to exit my voice mail system, without having to make a separate call, without having to wait through several ring cycles to reach my husband's voice mail system, without having to remember all of the details of the change in the soccer schedule, and without having to record a new message.

Some people, like my husband, pay less attention to waiting voice mail messages than to "live" or real-time calls. Thus, my husband may ignore my voice mail message regarding the change in his soccer schedule, and as a result, may fail to make appropriate schedule adjustments and may miss his soccer game. Knowing the unhappiness a missed soccer game will cause my husband, I would prefer to inform him of the change in soccer schedule through a real-time call. I could wait to call him until a time when I know he will be available to take the call. But that is an inconvenience to me. Moreover, I may forget to make the reminder call at the later time. Even if I remember to make the call, I may garble the message. There is a need for a way to be able to provide the information about the change in the soccer schedule in a real-time call that may be scheduled for a time when my husband is available. It would be desirable to furnish my husband with the actual voice mail message at a time convenient to him and in a real-time telephone call.

The voice mail message I received about the change in the soccer schedule may be pertinent to other members of my husband's team. It would be convenient if I could relay the information about the schedule change to the other members at the same time that I relay the information to my husband. Thus, there is a need for a way to convey information received in a voice mail system message as a reminder message to more than one other person or destination. It would also be desirable to have a way to convey the information to each of the other people or destinations at a time when and in a manner that is most convenient to the recipient. Thus, there is a need for a way to convey information received in a voice mail message as a reminder message to more than one other person or destination at respectively different times.

The change in my husband's soccer schedule may affect my own activities. For example, as a result of the change in the soccer schedule, I may have to pick-up my husband from the soccer game. It would be desirable to have a way to remind myself to pick him up. I could leave myself a note, tie a string around my finger, or take other measures. But these reminders are easily overlooked. A ringing telephone is not as easily overlooked. It would be desirable to receive a reminder call in advance of the time I need to pick up my husband from his soccer game.

In some systems, I would be able to record a message and designate a time for delivery to myself. But, again, having to leave the voice mail system and record a message is time consuming and inconvenient. It would be great if I could have the original voice mail message regarding the change in soccer schedule delivered to me at an appropriate time. Further, it would be even better if I could have the original voice mail message delivered to me on my cell phone (rather than the home telephone) because I will be out shopping just prior to having to pick up my husband from soccer. Thus, there is a need for a way to convey information such as a reminder message at an appropriate time, conveniently, and in a manner that is not easily overlooked.

In sum, there is a need for methods and systems that relay information in an efficient and accurate manner. In particular, there is a need for methods and systems that allow for the information in a voice mail message to be relayed to one or more others in an efficient and accurate manner. There is a further need for methods and systems that allow for the information in a voice mail message to be conveyed at a time and in a manner most convenient or advantageous to the sender and/or the recipients. Finally, there is a need for methods and systems that allow a voice mail message to be provided at a later time as a reminder message in a manner that will be noticed and at a time appropriate to the subject matter.

SUMMARY OF THE INVENTIONS

The inventions satisfy the needs described above by methods and systems that allow one or more voice mail messages, respectively, to be provided as one or more reminder messages. Advantageously, a user may create a reminder message based on a voice mail message without having to record his or her own message, without having to make a separate call or calls, and without having to take actions outside the voice mail system. The user may designate that the reminder message be delivered in a telephone call to the user at an appropriate later time.

When a user enters his or her voice mail system, an exemplary embodiment of the inventions provides the user with an option of reviewing voice mail messages or of reviewing existing reminder messages that the user may have created. Advantageously, one of the purposes of allowing the user to review the existing reminder messages is to allow him or her to change the delivery information regarding any one or more of the reminder messages. If the user changes the delivery information regarding an existing reminder message, then the message is delivered based on the changed information.

As the user reviews voice mail messages, he or she may be provided with an option of designating any one or more of the voice mail messages as a reminder message. The user may provide delivery information, which may include the user's telephone number, another telephone number, multiple telephone numbers, or identifiers for other devices. The delivery information also may include a designated time for delivery or different times for each of the destinations.

The delivery of the reminder message may be password protected. The reminder message is routed based on the delivery information. If the reminder message is password protected, the reminder message is delivered in response to receipt of the password. The routing and delivery of the reminder message may include placing a telephone call to each of the destinations provided in the delivery information and playing the reminder message in the telephone call. In some cases, the recipient of the reminder message may make use of a "snooze option" and designate that the reminder message be played at a later time than when received.

Another exemplary embodiment of the inventions provides a method of repeating information at a later time. The information is played to a user. If an indication is received from the user that the information is to be repeated at a later time, the information is played at the later time. The information may be played in a telephone call. The information may be designated as password protected and only played if the password is received. This exemplary embodiment also provides the user with an option of reviewing other information previously designated for playing at another time. As part of the review, the user may change delivery information relating to the information to be played at the later time.

Yet another exemplary embodiment of the inventions is a method for providing information. A message is played to a party based on the party's telephone number. An indication may be received that the message is to be replayed at a later time. The message may be replayed by calling the telephone number of the party or by delivering the message at the later time to another telephone number. If the message is to be delivered at the later time to the other telephone number, delivery information including the other telephone number is received. The delivery information may include a time at which the message is to be routed.

After the user provides the delivery information, an opportunity may be provided to the user to change the delivery information. Prior to routing of the message, the user may be provided with a confirmation of the delivery information. The message then is routed to the other party based on the other telephone number. In some cases, the other party may be provided with a snooze option. Upon receipt of the information (or after being provided with the information), the other party may designate that the information be provided at a later time.

In sum, a user may make use of his or her voice mail system to listen to voice mail messages, and then to designate one or more of the voice mail messages as reminder messages. The user may specify a time for delivery of the reminder messages. The user does not have to exit the voice mail system to set up delivery of the reminder messages. The user does not have to record a message, make a separate call, or repeat the substance of the message. The exemplary embodiments receive delivery information from the user regarding the reminder messages, and deliver the messages. Thus, the user is provided with methods to pass on information in an efficient and affordable manner.

Other features and advantages of the inventions may be more clearly understood and appreciated from a review of the following detailed description and by reference to the appended drawings and claims.

DETAILED DESCRIPTION

Generally stated, the inventions include methods and systems that allow one or more voice mail messages, respectively, to be provided as one or more reminder messages.

Figure 1:
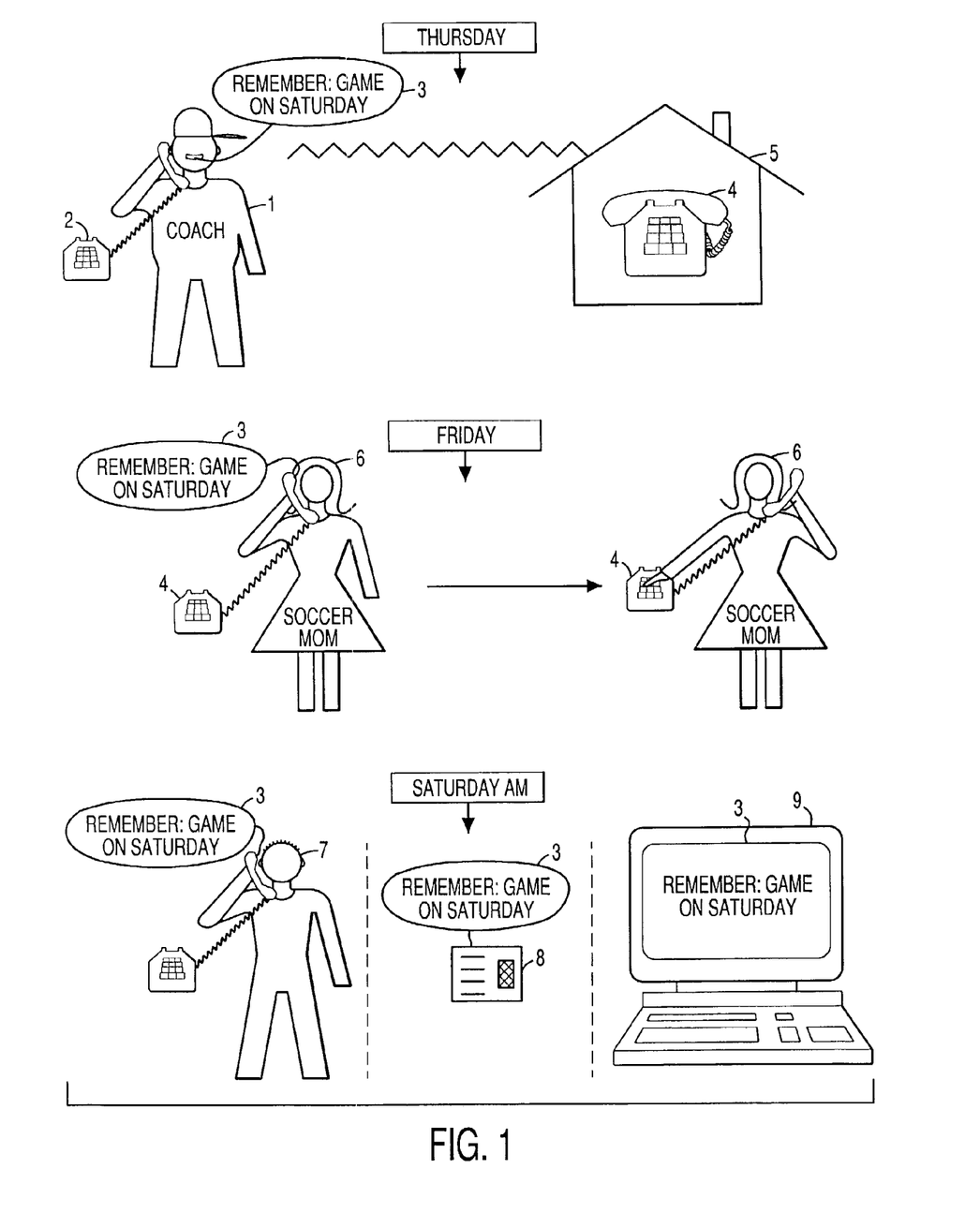
FIG. 1 is a diagram illustrating actions of an exemplary embodiment of the inventions.

As an introduction, FIG. 1 is a diagram illustrating actions of an exemplary embodiment of the inventions. In this example, on a Thursday, Coach Ed 1 uses his telephone 2 to remind the members of his soccer team that the weekend's game has been scheduled for Saturday at 2:00 p.m. Coach Ed's call may be directed to the home telephone number of one of his players, Anita. Nobody in Anita's home 5 answers Coach Ed's call, so he records a voice mail message that is accessible through a telephone 4 in Anita's home 5.

On Friday, Anita's mother 6 reviews the voice mail messages that have been received. As part of the review, Anita's mother 6 hears the announcement 3 that the soccer game is scheduled for Saturday at 2:00 p.m. After hearing the announcement, Anita's mother 6 makes use of an exemplary embodiment of the inventions to change the voice mail message including the announcement 3 to a reminder message to be directed to three other destinations. Moreover, Anita's mother 6 makes use of a feature of the exemplary embodiment that allows her to specify that the voice mail message be delivered at a later time to the three destinations.

On Saturday morning, Coach Ed's voice mail message is delivered as a reminder message per Anita's mother's direction to three different destinations at three respectively different times. First, Coach Ed's voice mail message including the announcement 3 is delivered as a reminder message in a telephone call to Anita's father 7 at 10 AM when he is doing some catch-up paperwork at the office. Second, Coach Ed's voice mail message including the announcement 3 is delivered as a reminder message in a telephone call at noon to Anita's grandmother, who does not like to answer telephone calls herself. Anita's grandmother allows the call to rollover to an answering machine 8, and she hears the announcement 3 at noon. Third, Coach Ed's voice mail message including the announcement 3 is delivered as a reminder message in a call at 1:30 p.m. to Anita's computer 9. Anita is busy playing computer games, and Coach Ed's announcement 3 is presented to her on her computer display at 1:30 p.m. as a prompt to Anita to get ready for her soccer game at 2:00 pm. For example, a .wav file containing Coach Ed's message may be delivered to Anita's personal computer. Anita may be alerted to the reminder message by the flashing or other action of an appropriate icon (such as an icon representing an answering machine, a soccer ball, etc.). The icon may include information relating to the reminder message such as a heading, title, date or time, or identification by name or number of the person associated with the message. This information that may be included with the icon may be obtained from caller identification information or in other ways. In addition, Anita may be presented with information on her computer display on how to access Coach Ed's message.

Advantageously, the exemplary embodiment allows Anita's mom 6 to relay Coach Ed's voice mail message including the announcement 3 as a reminder message in an efficient manner to three other destinations. Moreover, Anita's mom 6 is able to direct the delivery of the voice mail message including the announcement as a reminder message to the best advantage of each recipient.

After a description of an exemplary environment for operation of the inventions made with reference to FIG. 2, additional details regarding the exemplary embodiments are provided below with reference to FIGS. 3-6.

Figure 2:
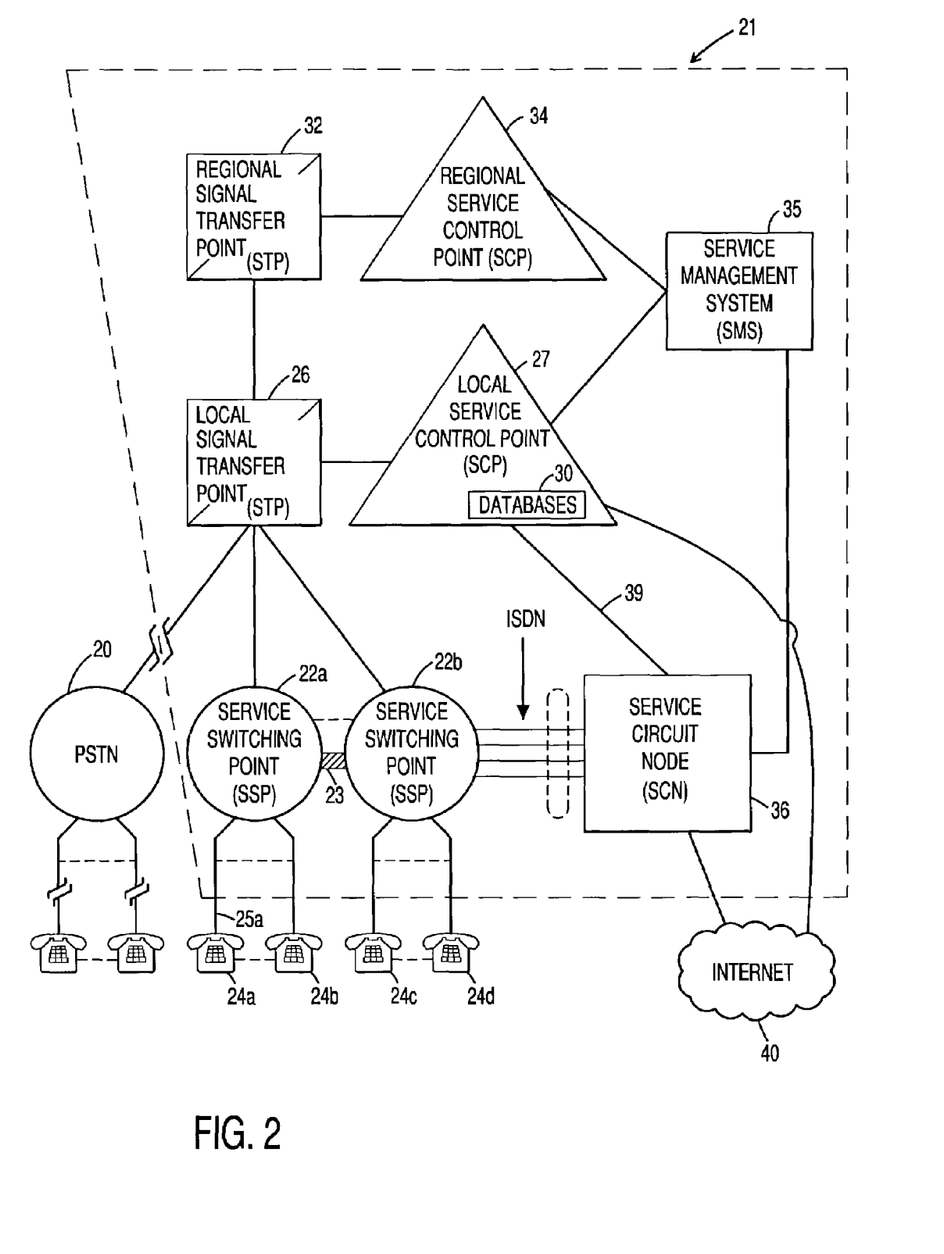
FIG. 2 is a diagram of an exemplary environment for the inventions.

An Exemplary Environment—FIG. 2

Exemplary embodiments of the invention may be operated in an environment including the public switched telecommunication network (PSTN) 20 with elements of an Advanced Intelligent Network (AIN) 21. For brevity, only a basic explanation of the AIN 21 is provided herein. Where the AIN 21 operates or is composed differently in an important aspect from that which would be understood by those skilled in the art, additional details are provided herein. For further information regarding the referenced AIN 21 and aspects thereof, the interested reader is referred to the commonly assigned patent to Weisser, U.S. Pat. No. 5,430,719, which is incorporated herein by reference.

The AIN 21 includes a variety of interconnected network elements. A group of such network elements includes the plurality of central offices which are indicated as service switching points (SSPs) 22a, 22b in FIG. 2. An SSP typically includes switch functionality, but also includes other functionality so as to communicate with other AIN elements. As further illustrated in FIG. 2, the SSPs 22a, 22b have a plurality of subscriber lines connected thereto. A subscriber line may also be referred to as a calling line. Each SSP serves a designated group of lines (also referred to as "calling lines") and thus, the SSP that serves a particular calling line may be referred to as its serving SSP. Each line is connected typically to a piece of terminating equipment including a plurality of telephones commonly referenced as 24 and individually referenced as 24a, 24b, 24c and 24d. Although telephones are illustrated as the terminating equipment in FIG. 2, such pieces may include other telecommunication devices such as answering machines, facsimile machines, computers, modems, etc. Each active line in an AIN is assigned a ten digit number commonly referred to as a telephone number or a line number.

Referring again to FIG. 2, SSPs 22a, 22b are interconnected by a plurality of trunk circuits 23. These are the voice path trunks that interconnect the SSPs to connect communications. The term "communication" or "call" is used herein to include all messages that may be exchanged between caller and called party in the network illustrated in FIG. 2.

Each of the SSPs 22a, 22b is typically connected to another type of AIN element referred to as a local signal transfer point (STP) 26 via respective data links. Currently, these are data links employing a signaling protocol referred to as Signaling System 7 (SS7).

Much of the intelligence of the AIN resides in yet another type of AIN element referred to as a local service control point (SCP) 27 that is connected to STP 26 over an SS7 data link. Among the functions performed by the SCP 27 is the maintenance of network databases and subscriber databases as represented collectively by databases 30. These databases may be used in providing services to a customer. Typically, the SCP 27 is also the repository of service package applications (SPAs) that are used in connection with or as part of the databases 30 in the application of advanced services or enhanced features. For example, an SPA in the SCP 27 may be used in providing network voice mail service to customers. Alternatively, a separate voice mail system (VMS) or voice mail platform (not illustrated) may be connected to the AIN 21 for use in providing such services. Further, the SCP 27 may be connected (through appropriate gateways (not illustrated)) to a global data network such as the Internet 40.

A third party service provider or other service provider (OSP) may have a device (not illustrated) similar to an SCP linked to the AIN 21. Typically, an OSP's device is linked through an SCP of the local service provider maintain network integrity. The OSP's device may provide a customer with voice mail service.

Referring again to FIG. 2, the local STP 26 may be connected to other network elements through a regional STP 32, which in turn, may be connected to a regional SCP 34. Both regional SCP 34 and local SCP 27 are connected via respective data links to a service management system (SMS) 35. The SMS 35 interfaces to business offices of the local exchange carrier and interexchange carriers.

In order to keep the processing of data and calls as simple as possible, a set of triggers is defined at the SSPs. A trigger in the AIN is an event associated with a particular line that generates a packet to be sent to an SCP. The trigger causes the SCP to query its databases, service package applications, or other elements or devices for processing instructions with respect to the particular call. The results are sent back to the SSP in a response from the SCP 27 through STP 26. The return packet includes instructions to the SSP as to how to process the call. The instructions may be to take some special action as a result of a customized calling service or enhanced feature. In response, the SSP moves through its call states, collects the called digits, and generates further packets that are used to set up and route the call. Similar devices for routing calls among various local exchange carriers are provided by regional STP 32 and regional SCP 34.

As illustrated in FIG. 2, the AIN 21 also includes an intelligent peripheral 36 (IP), such as a service circuit node (SCN) or service node (SN). The IP 36 includes voice and dual tone multi-frequency (DTMF) signal recognition devices and voice synthesis devices. IP 36 is connected to the local SCP 27 via data link 39 using an X.25 protocol and to the SMS 35 via a data link. In addition, IP 36 typically is connected to one or more (but usually only a few) SSPs via Integrated Service Digital Network (ISDN) links as shown by the connection to SSP 22b. The IP 36 may include service package applications (SPA) and have access to other elements such as databases. The IP 36 may include or provide a voice mail system. Further, the IP 36 may be connected through appropriate gateways to a global data network such as the Internet 40.

Provisioning of an Exemplary Embodiment

Typically, the inventions are implemented as subscription features available to subscribers of voice mail services. The inventions may be implemented in a network voice mail system, in customer premise equipment (CPE) that communicates with the network of a service provider, or in a data device such as a computer that provides voice mail service and may have access to the PSTN (including the AIN) and the Internet. In addition, the inventions may be implemented as part of a voice mail system serving a public branch exchange (PBX) system or the like.

Once a customer has subscribed to the features provided by any of the exemplary embodiments, then the program or application implementing the voice mail service (VMS) is set up to take additional actions in light of the exemplary embodiments and with respect to the customer. Once a customer designates a voice mail message as a reminder message, then that message is saved as such in association with delivery information provided by the subscriber. The delivery information allows for delivery of the reminder message at a later time. Thus, a flag or other indicator may be set so that when the time for delivery of the reminder message arrives, the reminder message is delivered on time.

The term "reminder message" is used herein to refer to a voice mail message that has been designated by a subscriber to be delivered at a later time, and that may be delivered to one or more destinations at respectively different times. A "reminder message" also may be referred to herein as a "follow-up message", or simply as a "message".

Further, an exemplary embodiment allows for a "snooze" feature. For example, a recipient may receive a reminder message, and wish to be reminded again later. Advantageously, the embodiment notes the desire of the recipient and takes actions to deliver the reminder message again at the specified time. The implementation actions may include changing the delivery information associated with the reminder message from the first delivery time to the second delivery time.

The delivery of a reminder message may require the reminder message to be played in a call or communication to a designated telephone number. Thus, the VMS is set to make a call to the designated telephone number at the specified time, and to play the reminder message in response to pick-up of the call. If the call is not picked-up, then exemplary embodiments may take various actions as explained below.

As also explained below, some of the exemplary embodiments provide a subscriber an opportunity to review existing reminder messages as well as voice mail messages. Thus, the VMS is programmed to provide for this opportunity.

Figure 3:
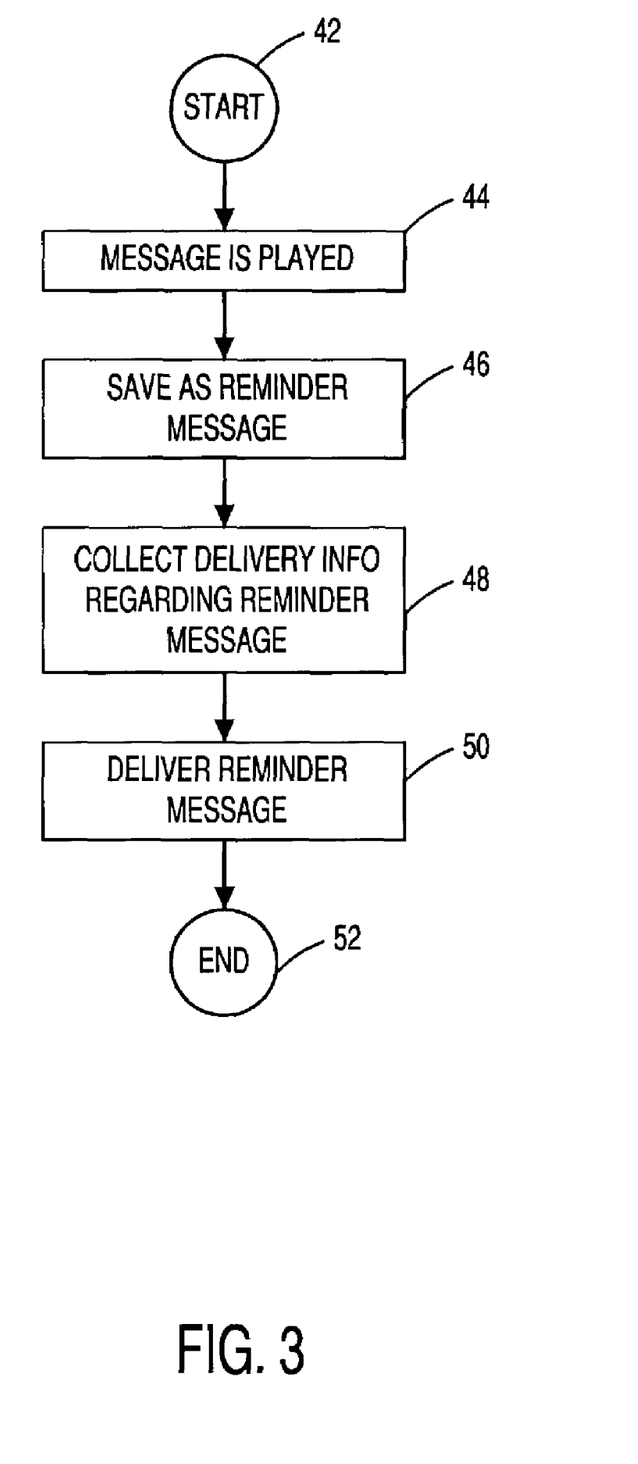
FIG. 3 is a flow diagram illustrating actions of an exemplary embodiment of the inventions.

Exemplary Actions—FIG. 3

FIG. 3 is a flow diagram illustrating actions of an exemplary embodiment of the inventions when a voice mail message is delivered as a reminder message. Assume a user (also referred to as a subscriber) accesses his or her voice mail system. After start 42, a message is played in action 44. The message is saved as a reminder message in action 46.

Delivery information regarding the reminder message is collected in action 48. The delivery information may include one or more telephone numbers, or other addresses for delivery of the reminder message. The telephone number may, by default or otherwise, be the telephone number of the subscriber. In this case, the subscriber is sending himself or herself a reminder message.

In addition, the delivery information may include a time for delivery of the reminder message with respect to each of the destination telephone numbers or addresses. The time for delivery may be the same or different or a combination thereof with respect to the destination telephone numbers or addresses. An option for time of delivery may be "immediate" delivery in which case the reminder message is routed to the destination number as soon as the formalities regarding the creation of the reminder message are completed.

After collection of the delivery information, the reminder message is delivered based on the delivery information in action 50, and the exemplary actions end 52. As described above in connection with FIG. 1, the reminder message may be delivered in a call to a telephone, to an answering machine, or even to a computer appropriately configured. Nevertheless, the reminder message may be delivered to any appropriately configured device such as a wireless unit, personal digital assistant (PDA), laptop, or even a text pager or an interactive-pager.

Figure 4:
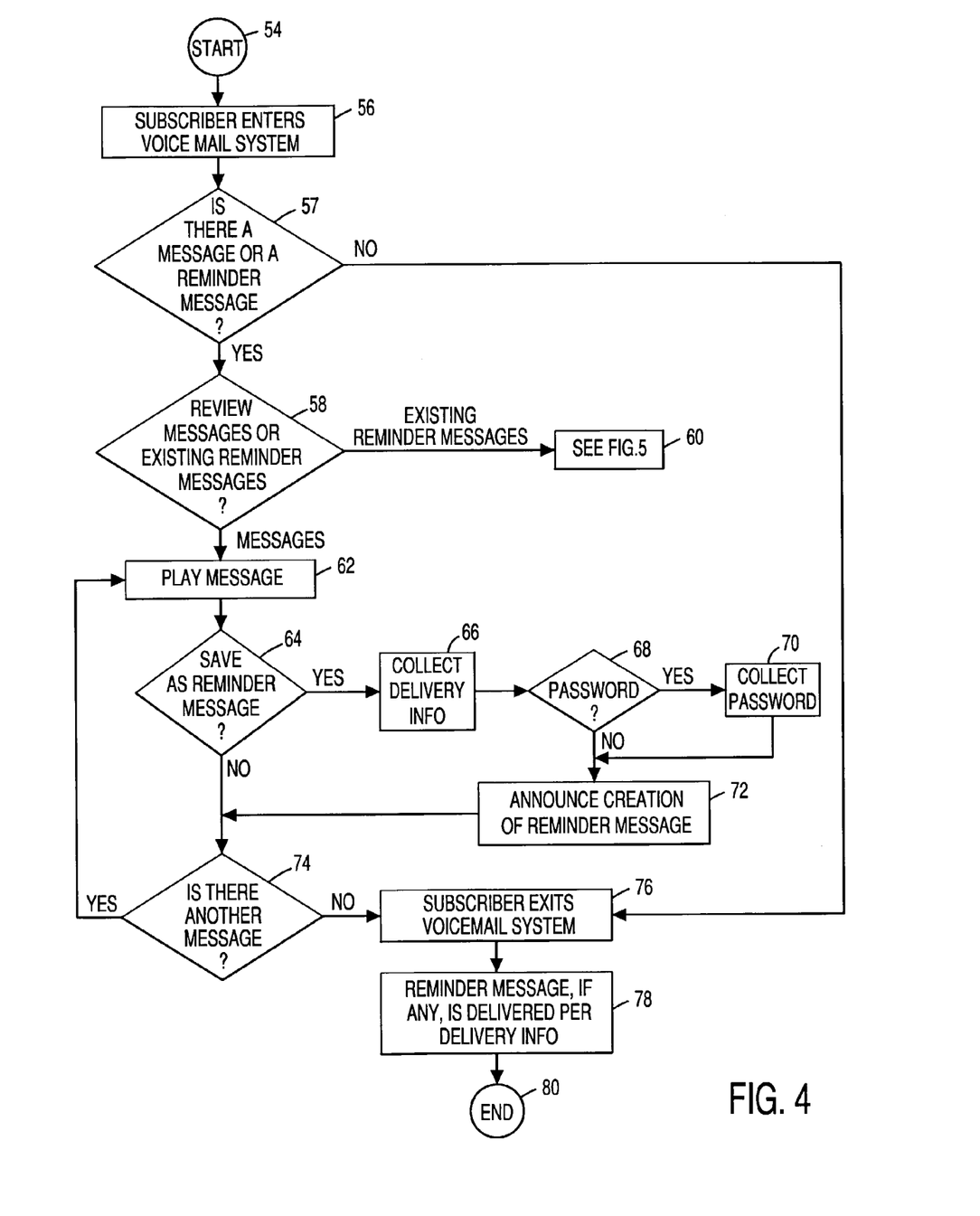
FIG. 4 is a flow diagram illustrating actions of another exemplary embodiment of the inventions.

Exemplary Actions—FIG. 4

Figure 5:
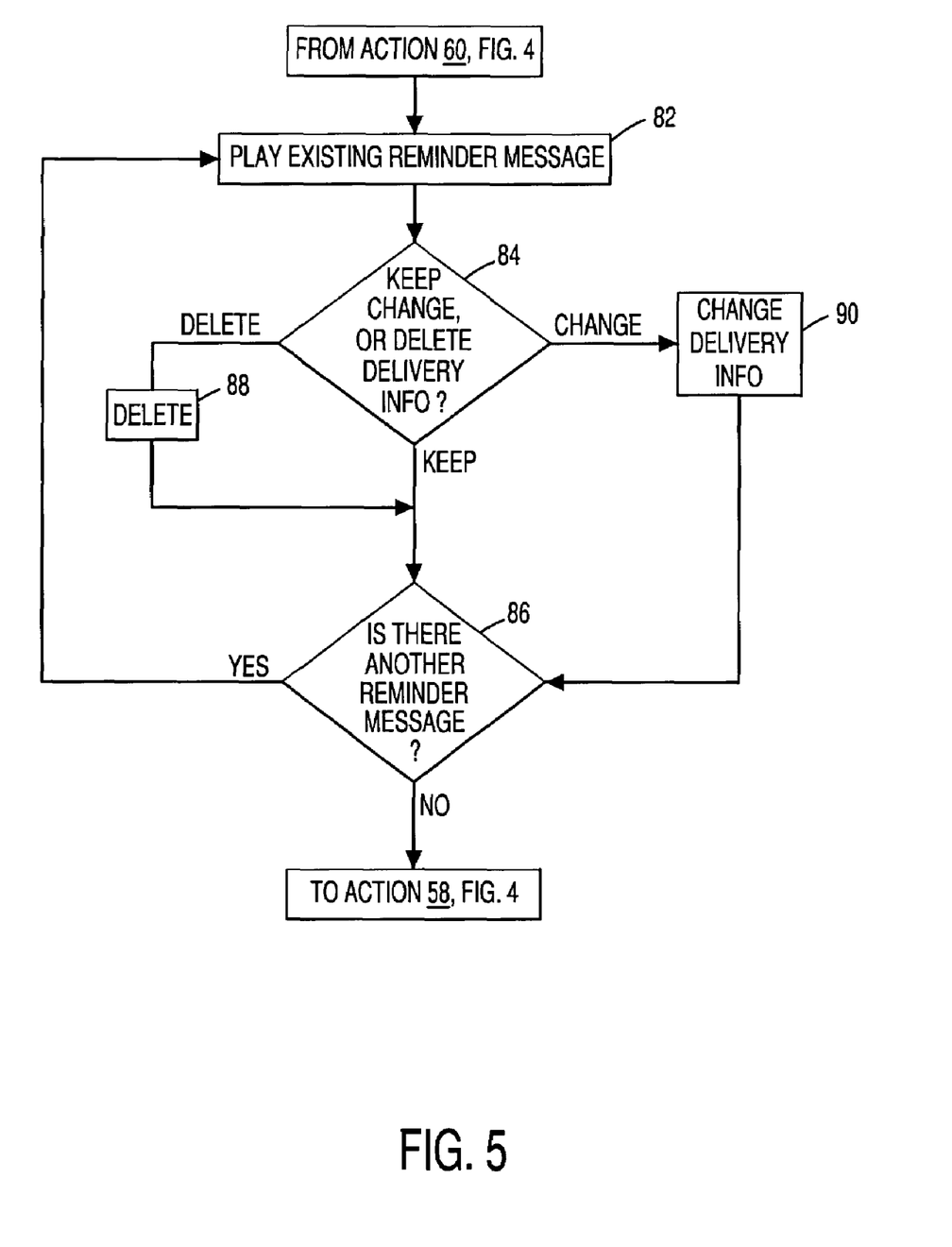
FIG. 5 is a flow diagram illustrating additional actions of the exemplary embodiment illustrated by FIG. 4.

FIG. 4 is a flow diagram illustrating actions of another exemplary embodiment of the inventions. After start 54, the subscriber enters the voice mail system in action 56, and in action 57 a check is carried out to determine if there is any voice mail message or reminder message for review. If there is no voice mail message or reminder message for review, then the process proceeds to action 76 (described below). If there is a voice mail message or a reminder message, then in action 58 the subscriber is presented with a choice of reviewing voice mail messages or existing reminder messages. An existing reminder message is a message that has already been designated by the user as a reminder message. Advantageously, the subscriber is presented with the opportunity to review any existing reminder messages. The review also includes the ability to change delivery information regarding an existing reminder message. For details regarding the actions of the exemplary embodiment if the subscriber chooses to review existing reminder messages, action 60 indicates that FIG. 5 is to be consulted.

Referring again to action 58, if the subscriber chooses to review voice mail messages, then in action 62 a voice mail message is played. After the message is played, in action 64 the subscriber is asked whether the voice mail message is to be saved as a reminder message. Alternatively, during or after the playing of the voice mail message, the subscriber may interrupt or take a short-cut (such as by pressing designated keypads) and have the message saved as a reminder message.

If the subscriber chooses to save the voice mail message as a reminder message, then in action 66 delivery information is collected from the subscriber. Such delivery information may include the telephone number or other address for the delivery of the reminder message, and the time of delivery. The term "time" is used herein to also include "date". So, a delivery time may be "tomorrow at 2:00 p.m." or "Dec. 25, 2002 at 5:00 p.m."

Advantageously, the exemplary embodiment provides that the reminder message may be password protected. To receive a reminder message that is password protected, a recipient must provide the correct password prior to the delivery of the reminder message. In action 68, the subscriber is asked whether the reminder message is to be password protected. If so, then in action 70 a password is collected from the subscriber. After providing the password, or if the subscriber elects not to have the reminder message password protected, in action 72 the exemplary embodiment may announce the creation of the reminder message. In some embodiments of the inventions, the reminder message may be delivered or set for delivery at this point in the process without having the subscriber move on to another message, or to exit the voice mail system.

After the creation of the reminder message, in action 74 the exemplary embodiment checks whether there is another voice mail message available for review by the subscriber. If so, then the embodiment returns to action 62 wherein the next message is played and subsequent actions as described above take place.

If there is no other voice mail message available for review by the subscriber, then in action 76 the subscriber exits the voice mail system. In some embodiments, the subscriber may at this point again be presented with the opportunity to review existing reminder messages (See action 60, FIG. 4, and FIG. 5 for details).

Advantageously, the exemplary embodiment carries out the instructions of the subscriber in delivering a voice mail message as a reminder message at a specified time and to a specified telephone number or other address. Based on the delivery information provided by the subscriber, in action 78 (or earlier in some embodiments) the exemplary embodiment delivers the reminder message, if any, and the exemplary embodiment ends 80.

Exemplary Actions of Reviewing Existing Reminder Messages—FIG. 5

As noted above in connection with action 58 of FIG. 4, an exemplary embodiment of the inventions advantageously provides the subscriber with a choice between reviewing existing reminder messages and voice mail messages. FIG. 5 is a flow diagram illustrating actions that may take place with respect to the review of existing reminder messages.

In action 82, an existing reminder message is played for the subscriber. After the existing reminder message is played, the subscriber may be asked in action 84 whether the delivery information associated with the existing reminder message is to be kept, changed, or deleted.

If the delivery information is to be kept, then in action 86 a check is made to determine whether there is another existing reminder message to be played. If there is, then the exemplary embodiment returns to action 82 of playing the next reminder message and subsequent actions associated therewith. If there are no further reminder messages to be played, then the exemplary embodiment returns to action 58, FIG. 4, and makes inquiry of the subscriber as to whether he or she desires to review voice mail messages, if there are any.

Referring again to action 84, FIG. 5, if the subscriber decides to delete the delivery information with respect to an existing reminder message, then in action 88 the delivery information is deleted. Deletion of the delivery information, may in some embodiments, cause deletion of the existing reminder message. After the deletion of the delivery information, the exemplary embodiment proceeds to action 86 in checking whether there is another reminder message to review and to carry out subsequent actions.

Referring yet again to action 84, FIG. 5, if the subscriber decides to change the delivery information, then in action 90 such information is changed. Advantageously, the subscriber may change all or part of the delivery information. After the change to the delivery information, the exemplary embodiment proceeds to action 86 in checking whether there is another reminder message to review and to carry out subsequent actions.

Some embodiments of the inventions may provide a subscriber with a "skip" option with respect to review of information such as existing reminder messages or delivery information associated with an existing reminder message. By taking advantage of a skip function, the subscriber may move on to the next action or information typically without changing the skipped information.

Figure 6:
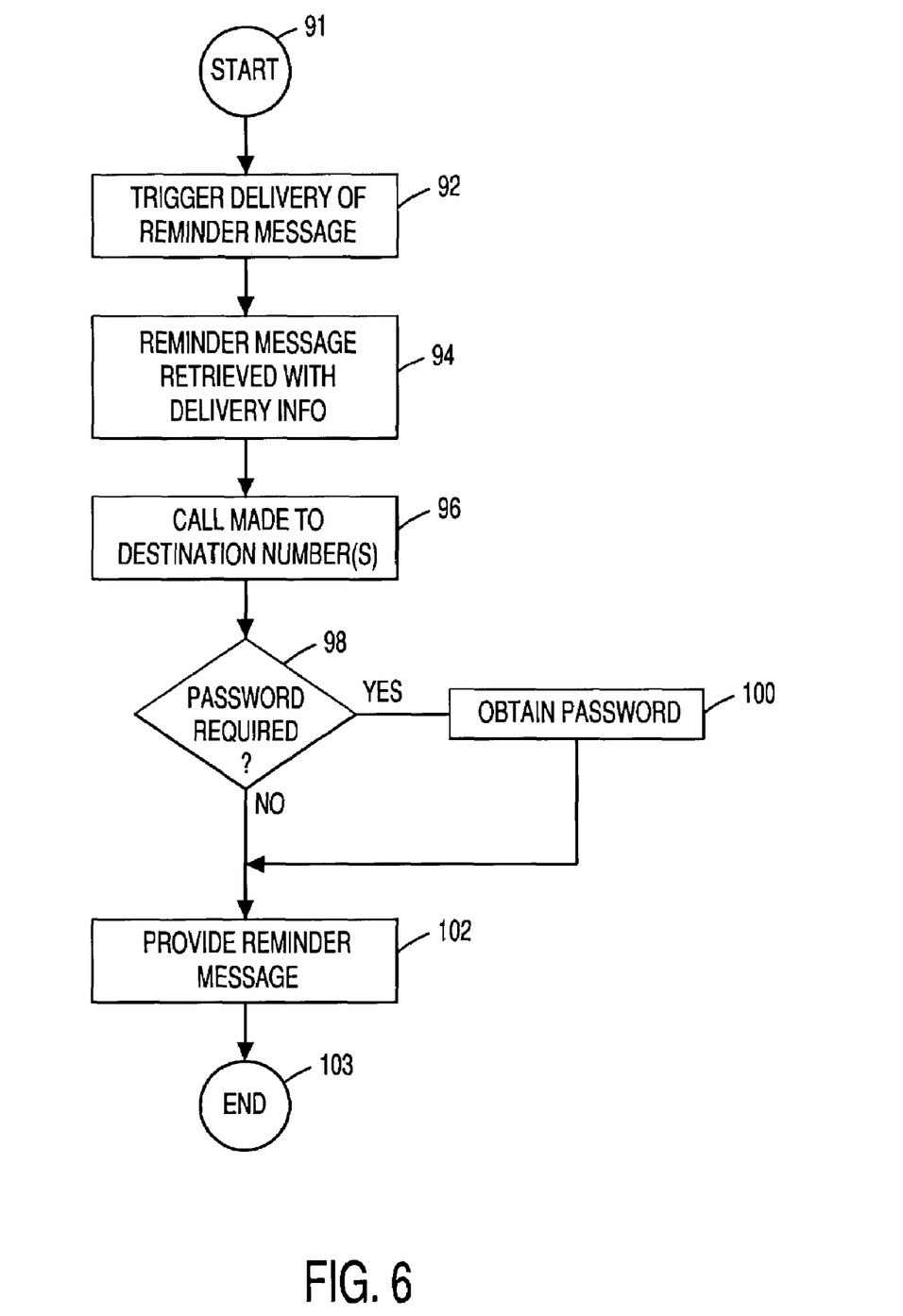
FIG. 6 is a flow diagram illustrating actions of yet another exemplary embodiment of the inventions.

Exemplary Actions in Delivering A Reminder Message—FIG. 6

FIG. 6 is a flow diagram illustrating actions that may be taken by an exemplary embodiment as part of the delivery of a reminder message. After start 91, action 92 represents an action or event that triggers the delivery of the reminder message. The delivery may be triggered based on time, or another event. After the trigger action 92, in action 94 the reminder message is retrieved with its associated delivery information, or at least the part of the delivery information that provides the destination information for routing or delivery of the reminder message. In action 96, a call is (or calls are) made to deliver the reminder message to one or more destination numbers. As noted previously, a reminder message may be delivered to a telephone, or to another device such as a computer, personal digital assistant, text pager, or interactive pager. Thus, the term "call" herein may be used to refer to the communication carried out to deliver the reminder message. In addition, the term "telephone number" may be used synonymously with the term "address" with respect to the delivery of the reminder message.

Advantageously, an exemplary embodiment allows for the reminder message to be password protected. In action 98, a check is made to determine whether a password is required prior to delivery such as playing of the reminder message in the telephone call. If no password is required, then the reminder message is played in action 102, and the exemplary embodiment ends 103. If a password is required, then the recipient is requested for a password. If the password that is obtained (as indicated in action 100) is correct, then the reminder message is played in action 102, and the exemplary embodiment ends 103.

If the password that is obtained is incorrect, then the exemplary embodiment may request the recipient to provide the password. If the recipient continues to provide an incorrect password (or no password), then after a designated number of cycles, the exemplary embodiment may hang up or otherwise end the call without playing of the reminder message.

As another advantage, an exemplary embodiment provides the recipient of the reminder message with a "snooze" option or feature. For example, a recipient may receive a reminder message, and wish to be reminded again later. Advantageously, the embodiment notes the desire of the recipient and takes actions to deliver the reminder message again at the later time specified by the recipient. The implementation actions may include changing the delivery information associated with the reminder message from the first delivery time to the second delivery time.

Exemplary embodiments of the inventions may provide for various actions depending on whether or not the call with the reminder message is answered. For example, an exemplary embodiment may make more than one effort to deliver a reminder message. If a call with the reminder message is not answered within a designated number of ring cycles, then an exemplary embodiment may check whether the maximum number of call attempts have been made. If the maximum number have not been made, then the exemplary embodiment may continue to call until the call is answered or until the maximum number of call attempts have been made.

Once the maximum number of call attempts have been made with no answer, then the exemplary embodiment may enter the information in a log. The log may be provided to or may be made accessible to the subscriber. The log (or individual call attempts) may be reported to the subscriber when the subscriber next logs into his or her voice mail system.

If the reminder message call is answered by a voice mail system, an exemplary embodiment treats the call as "unanswered". This exemplary embodiment may keep trying to deliver the reminder message until the maximum number of call attempts have been made or the call is answered by other than a voice mail system.

CONCLUSION

From the foregoing description of the exemplary embodiments of the inventions and operation thereof, other embodiments will suggest themselves to those skilled in the art. Therefore, the scope of the inventions is to be limited only by the claims below and equivalents thereof.

What is claimed is:

1. A method to use one or more voice mail messages, respectively, as one or more reminder messages, comprising:

receiving a voice mail message at a voice mail server, the voice mail message being created by a voice mail sender, the voice mail message being configured for delivery to a voice mail user;

providing, to the voice mail user, an option to review at least one voice mail message;

providing, to the voice mail user, an option to review at least one reminder message;

delivering the voice mail message to the voice mail user;

after delivering the voice mail message to the voice mail user, providing an option of using the voice mail message as a reminder message;

receiving a response, from the voice mail user, to the option of using the voice mail message as a reminder message;

in response to receiving a positive response to the option of saving the voice mail message as a reminder message, soliciting delivery information for the reminder message;

receiving delivery information from the voice mail user, the delivery information including a user-defined delivery time for the reminder message;

in response to receipt of the delivery information, setting up the voice mail message as the reminder message for routing based on the delivery information; and re-delivering the voice mail message as the reminder message according to the delivery information.

2. The method of claim 1, wherein the delivery information comprises a telephone number; and wherein re-delivering the voice mail message as the reminder message according to the delivery information comprises routing a call including the reminder message to the telephone number.

3. The method of claim 1, wherein the delivery information comprises a designated time; and wherein re-delivering the voice mail message as the reminder message comprises delivering the reminder message at the user-defined time.

4. The method of claim 1, wherein the delivery information comprises multiple destinations; and wherein the reminder message is delivered to each of the multiple destinations.

5. The method of claim 4, wherein the delivery information comprises a different time, respectively, for each of the multiple destinations; and wherein the reminder message is delivered at each different time, respectively, for each of the multiple destinations.

6. The method of claim 1, wherein the delivery information comprises an address for a device; and wherein the reminder message is delivered to the device using the address.

7. The method of claim 6, wherein the device comprises at least one of the following: a personal computer, a personal digital assistant, a text pager, and an interactive pager.

8. The method of claim 1, further comprising:

providing a first option of reviewing the one or more voice mail messages and a second option of reviewing one or more existing reminder messages, wherein the first option is different than the second option.

9. The method of claim 1, further comprising:

providing an option of password protection regarding delivery of the reminder message;

if the option of password protection is selected, setting up a password for the delivery of the reminder message; and delivering the reminder message in response to receipt of the password.

10. The method of claim 1, further comprising:
after receiving the delivery information, providing the voice mail user with an opportunity to change the delivery information;
if changed delivery information is received from the voice mail user, then setting up the voice mail message as the reminder message for routing based on the changed delivery information; and
based on the changed delivery information, delivering the reminder message.

11. A method for using a voice mail message as a reminder message, comprising:
receiving a voice mail message at a voice mail server, the voice mail message being created by a voice mail sender, the voice mail message being configured for delivery to a voice mail user;
providing, to the voice mail user, an option to review at least one voice mail message;
providing, to the voice mail user, an option to review at least one reminder message;
delivering the voice mail message to the voice mail user;
causing the voice mail message to be delivered to the voice mail user;
receiving an indication from the voice mail user to use the voice mail message as a reminder message;
receiving delivery information for routing of the voice mail message as the reminder message from the voice mail user, wherein delivery information includes a user-defined time for delivery of the reminder message;
causing the voice mail message to be routed as the reminder message based on the delivery information; and
causing the voice mail message to be re-delivered as the reminder message.

12. The method of claim 11, further comprising: providing an option of password protection regarding re-delivering the voice mail message as the reminder message;
if the option of password protection is selected, setting up a password for the re-delivery of the voice mail message as the reminder message; and
re-delivering the voice mail message as the reminder message in response to receipt of the password.

13. The method of claim 11, wherein the delivery information comprises telephone numbers to which the voice mail message is to be re-delivered as the reminder message.

14. The method of claim 11, wherein the delivery information comprises a telephone number of the voice mail user; and
wherein the voice mail message as the reminder message is routed to the telephone number of the user.

15. A method of repeating a voice mail message at a later time, comprising:
receiving a voice mail message at a voice mail server, the voice mail message being created by a voice mail sender, the voice mail message being configured for delivery to a voice mail user;
providing, to the voice mail user, an option to review at least one voice mail message;
providing, to the voice mail user, an option to review at least one reminder message;
delivering the voice mail message to the voice mail user;
delivering the voice mail message to the voice mail user;
receiving an indication from the voice mail user that the voice mail message is to be re-delivered at a user-defined later time;
receiving the later time from the voice mail user; and
re-delivering the information at the later time.

16. The method of claim 15, further comprising:
providing the voice mail user with an option of reviewing other information previously designated for playing at another time.

17. The method of claim 15, further comprising:
providing an option of password protection regarding re-delivering the information at the later time;
if the option of password protection is selected, setting up a password for re-delivering the information at the later time;
re-delivering the information in response to receipt of the password.

18. The method of claim 17, wherein the voice mail user indicates that the information is to be re-delivered at the later time by playing the information at the later time in a telephone call.

19. A method for providing information, comprising:
receiving a voice mail message at a voice mail server, the voice mail message being created by a voice mail sender, the voice mail message being configured for delivery to a voice mail user;
providing, to the voice mail user, an option to review at least one voice mail message;
providing, to the voice mail user, an option to review at least one reminder message;
delivering the voice mail message to the voice mail user;
delivering the voice mail message to the voice mail user based on a first telephone number of the voice mail user;
receiving an indication, from the voice mail user, that the voice mail message is to be re-delivered at a later time in a call to a telephone number determined by the voice mail user;
if the message is to be delivered at the later time to a second telephone number, the second telephone number being different than the first telephone number, receiving delivery information from the voice mail user, wherein the delivery information includes the second telephone number for routing the message and a user-defined time for delivery of the message; and
routing the message to the second telephone number.

20. The method of claim 19, further comprising:
after receiving the delivery information, providing the voice mail user with an opportunity to change the delivery information;
if changed delivery information is received from the voice mail user, then routing the message based on the changed delivery information.

21. The method of claim 19, further comprising:
after receipt of the delivery information, confirming the delivery information with the user prior to routing the message based on the delivery information.

* * * * *